US009009489B2

(12) United States Patent
Bellwood et al.

(10) Patent No.: US 9,009,489 B2
(45) Date of Patent: *Apr. 14, 2015

(54) DEVICE ARCHIVING OF PAST CLUSTER BINDING INFORMATION ON A BROADCAST ENCRYPTION-BASED NETWORK

(75) Inventors: Thomas A. Bellwood, Austin, TX (US); Robert G. Deen, San Jose, CA (US); Jeffrey B. Lotspiech, Henderson, NV (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,950

(22) Filed: Aug. 15, 2012

(65) Prior Publication Data

US 2012/0308002 A1    Dec. 6, 2012

Related U.S. Application Data

(63) Continuation of application No. 12/950,159, filed on Nov. 19, 2010.

(51) Int. Cl.
*G06F 11/30* (2006.01)
*G06F 12/14* (2006.01)
*H04L 9/08* (2006.01)

(52) U.S. Cl.
CPC ......... *H04L 9/0866* (2013.01); *H04L 2209/601* (2013.01)

(58) Field of Classification Search
None
See application file for complete search history.

(56) References Cited

U.S. PATENT DOCUMENTS

| 7,356,147 | B2 | 4/2008 | Foster et al. | |
| 7,412,063 | B2 | 8/2008 | Jung et al. | |
| 7,613,303 | B2 | 11/2009 | Jung et al. | |
| 7,685,636 | B2 | 3/2010 | Leake, Jr. et al. | |
| 2003/0198351 | A1* | 10/2003 | Foster et al. | 380/281 |
| 2005/0086532 | A1* | 4/2005 | Lotspiech et al. | 713/201 |
| 2006/0262927 | A1* | 11/2006 | Rutkowski et al. | 380/201 |
| 2006/0265338 | A1 | 11/2006 | Rutkowski et al. | |
| 2009/0016533 | A1 | 1/2009 | Jung et al. | |
| 2009/0028342 | A1 | 1/2009 | Cerruti et al. | |
| 2009/0089582 | A1 | 4/2009 | Brutch et al. | |
| 2010/0082991 | A1 | 4/2010 | Baldwin et al. | |

* cited by examiner

*Primary Examiner* — Andrew Nalven
*Assistant Examiner* — Quy Pham
(74) *Attorney, Agent, or Firm* — Thomas E. Tyson; Gregory K. Goshorn; Greg Goshorn, P.C.

(57) ABSTRACT

Provided are techniques for the creation and storage of an archive for binding IDs corresponding to a cluster of devices that render content protected by a broadcast encryption scheme. When two or more clusters are merged, a binding ID corresponding to one of the clusters is selected and a new management key is generated. Binding IDs associated with the clusters other than the cluster associated with the selected binding ID are encrypted using the new management key and stored on a cluster-authorized device in a binding ID archive. Content stored in conformity with an outdated binding ID is retrieved by decrypting the binding ID archive with the management key, recalculating an old management key and decrypting the stored content.

16 Claims, 5 Drawing Sheets

DEVICE ARCHIVING OF PAST CLUSTER BINDING INFORMATION ON A BROADCAST ENCRYPTION-BASED NETWORK

CROSS-REFERENCES TO RELATED APPLICATIONS

The present application is a continuation and claims the benefit of the filing date of an application entitled, "Device Archiving of Past Cluster Binding Information on a Broadcast Encryption-Based Network" Ser. No. 12/950,159, filed Nov. 19, 2010, assigned to the assignee of the present application, and herein incorporated by reference.

FIELD OF DISCLOSURE

The claimed subject matter relates generally to computer security and, more specifically, to techniques for archiving binding information employed by a cluster of devices.

SUMMARY

As computers and media devices have become connected via networks and the Internet, the amount of content transmitted among these devices has grown in proportion to the size of the communication channels, or the bandwidth. Once used primarily for electronic mail, or email, and small file transfers, networks such as networks in general and the Internet specifically are increasingly relied upon by providers to distribute high quality content such as movies and music recordings.

Service and content providers that distribute such service and high quality content face correspondingly increased production and/or licensing costs. Industries that seek to extend improved networked services to customers must assure that the collection and management of data remains in compliance with security policies and privacy requirements. To control security and restrict access to such material, service and content are sometimes protected by encryption, digital rights management (DRM) systems or conditional access (CA) systems.

A recent development in the field of encryption of digital data and communication is broadcast encryption. Broadcast encryption is based upon a Management Key Block (MKB), which is a block of cryptographic key data that can be used in conjunction with a set of Device Keys ($K_D$) on a receiving device (e.g. player, renderer etc.) to derive one or more Management Keys ($K_M$). These Management Keys can be used to (directly or indirectly) decrypt one or more content keys, which in turn can be used to decrypt content. Although for the purposes of the following examples, only a single title key is used, the claimed technology is also applicable to systems that employ multiple title keys. For example, some MKB configurations employ title key blocks in which different devices are potentially assigned to different security classes and derive a particular title key that corresponds to the assigned security class.

The term Content Key can be used to mean a simple Title Key ($K_T$), sets of Title Keys (for the same piece of content), Volume Keys, Sector Keys or Disk Keys and can be generalized to any granularity of key used to protect digital data. Large blocks of content may be divided into volumes, sectors or disks, each of which with a separate title key. For example, high definition video content may be divided into sectors that correspond to a progression of title keys that change either on a sector-by-sector basis or periodically during the course of a linear broadcast of the content. The MKB can be delivered concurrent with the content, for example at the beginning of a linear broadcast, or obtained "out-of-band" from a broadcast or internet service, messaged from other devices that are part of the same key space or placed on physical media in the case of prerecorded and recordable content. One of the largest advantages to broadcast encryption is that two or more devices, which might be previously unknown to each other, can agree upon a key over a one-way communication path. This advantage makes broadcast encryption ideal for the communication between two security system components. Another advantage is that broadcast encryption requires two or three orders of magnitude less overhead in the corresponding device than most other systems, thus lowering the cost of the devices for manufacturers and consumers.

Devices that implement the broadcast encryption mechanisms are said to "bind" the data and content they protect to a particular entity (e.g. storage media, a user, an account, a home network or cluster of one or more devices). The entity to which content is logically bound is represented by a domain unique binding identifier ($ID_B$) that is cryptographically combined with one or more management keys ($K_M$) to produce a different key, called the binding key ($K_B$). It should be noted that a $K_M$ used in conjunction with a $ID_B$ can be used as a basis of secure communication between devices in the same network, cluster or authorization table (AT), which is a list of authorized devices in a particular cluster. An example of how a $K_B$ is derived from a simple $K_M$, which is itself derived from a MKB, is explained below. Some current simple approaches to binding a piece of content to a particular entity, regardless of whether it is a piece of media, a device, or a user, is through one level of indirection in the calculation of is encrypted title key ($E_{KT}$) from the entity's binding key ($K_B$). In these cases, the procedure to encrypt a piece of content is roughly the following:

1. Extract a Management Key ($K_M$) by processing the MKB.
2. Perform a one-way function to a piece of data that uniquely identifies the entity this content is being bound to (or the "$ID_B$"), using Km and resulting in a binding key (i.e. $K_B=G(K_M, ID_B)$). In the case of cluster or network binding, $ID_B$ represents a unique network identifier.
3. Select a title key ($K_T$), which may be either random or predetermined, for this piece of content and encrypt it using $K_B$, resulting in an encrypted title key ($EK_T$) (i.e. $EK_T=E(K_B, K_T)$).
4. The content is encrypted with the $K_T$ and then the encrypted content is stored in conjunction with the $EK_T$.
5. If the MKB supports multiple security classes, repeat steps 1-4 for each Management Key at the desired security class to create a set of title keys. Implementations may choose to use the same set of title keys to protect a logical volume of content or all or portions of a disk of content.

Once the procedure has been, implemented, any compliant device that has access to the same MKB, $ID_B$ and $EK_T$ can decrypt a communication or content by reproducing the same $K_B$ and decrypting $K_T$.

In a further development, the broadcast encryption system has been extended to enable groups, domains or "clusters," of devices to be collected into secure authorized logical networks. In a particular cluster, the list of authorized devices is represented in an entity called an authorization table (AT). If a device's authorization state is changed (e.g. a new device is authorized, a device is suspended or deleted from the cluster), the AT is updated to reflect the change. The Authorization Table, in such a scheme, would be a component of the Binding Key; therefore, when it is updated any data encrypted by the Binding Key (e.g. Title Keys) would in turn need to be re-encrypted. As devices change "clusters" or networks (e.g. from sale or purchases) the $ID_B$ may also change, again causing a need for the binding key to be updated and hence all data or content keys.

In the ASCCT scheme, a particular device is always in a cluster, even if the cluster includes only the particular device. For example, when a device is first created, the device is initialized with an MKB, a set of device keys and an initial cluster defined by an AT that includes only the created device. The process of adding a device to the cluster consists of merging the current cluster with the cluster of the new device or devices. Both the current cluster and the new cluster posses their own secret binding IDs. The merged cluster selects one of the secret binding IDs for use with the new cluster and employs the selected binding ID to calculate a new binding key. The new binding key is then employed to bind any data bound to either of the merged clusters to the merged cluster. Any binding ID that was not selected in no longer used. This process repeats over the life of the cluster as new devices are added and the clusters are merged.

An addition development with respect to a broadcast encryption-based content protection scheme is, rather than a single $K_M$, multiple management keys, or management key variants $(K_{MV})$, e.g. $K_{MV}1$, $K_{MV}2$, and so on, are provided. Typically, a single device can only calculate a single $K_{MV}$. Management key variants are employed for forensic purposes in situations in which prepared content has been authored with different equivalent variations. Unlike the typical broadcast encryption-based content protection scheme in which device keys are used to directly derive a $K_M$, a device employs the device keys to derive a $K_{MV}$, which is then employed to derive a "base" $K_M$.

Another development is the introduction of management key precursors. Devices are assigned a security class and derive a management key precursor $(K_M(-i)$ or $K_M^{-i})$ from a $K_{MV}$. Devices of higher security classes are assigned higher "i" values. For example, a device with a security class of '3' would be of a higher security class than a device with a class of '1'. A "base," or the lowest, security class is a class of '0'. A device in a security class higher than the base class may calculate a $K_M(-i)$ for devices in a lesser security class, if necessary, all the way to the base class by iteratively executing the following one-way function: $K_M^{-(i-1)} = AES\_G(K_M^{-i}$, kcd), where kcd is a keyspace specific constant. Another development is the implementation of recording keys, which are similar to management key variants, and are employed when content is recorded locally in a particular cluster.

Provided are techniques for the archiving of broadcast-based encryption keying and binding materials, including receiving, at a first device, a first set of items, comprising: a first management key block (MKB); a first authorization table (AT); and a first binding identifier $(ID_B)$, wherein each item of the first set of items corresponds to a broadcast encryption-based data protection scheme; generating a first management key $(K_M)$ based upon the first set of items; storing the first MKB and the first AT in a first computer-readable storage medium; encrypting the first $ID_B$ using the first $K_M$ to generate a first archival $ID_B$; generating a first archival record by correlating the first archival $ID_B$ with information for locating and retrieving the first MKB and the first AT stored in the first computer-readable storage medium; and storing the first archival record in a second computer-readable storage medium.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
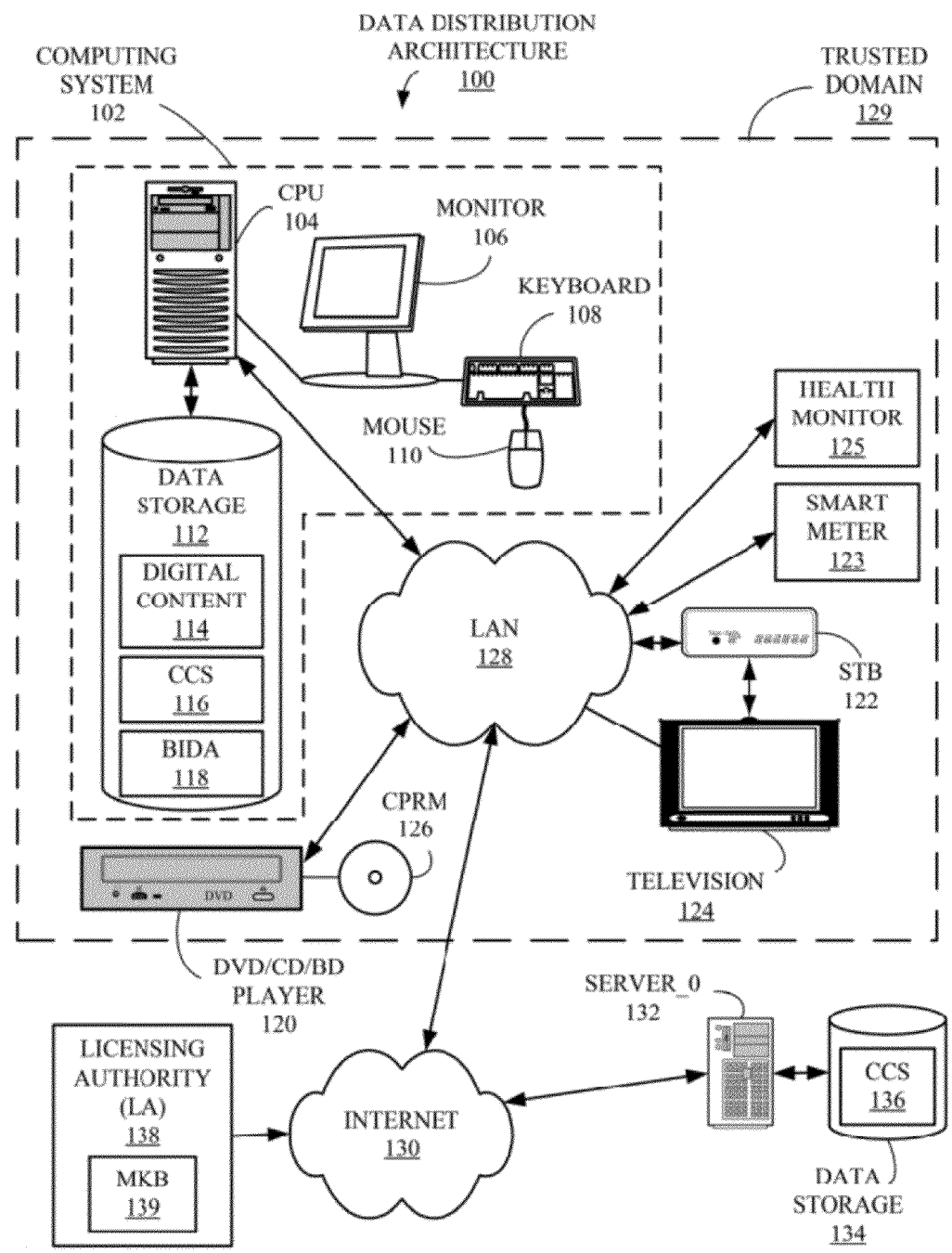
FIG. 1 is a block diagram of one example of a data distribution architecture that supports broadcast encryption (BE) for content protection and may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for archiving binding keys in a cluster of devices in which content is protected with a broadcast encryption scheme. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have recognized, as authorization tables (ATs), binding keys ($K_B$s) and clusters change and are updated, devices associated with an updated cluster are unable to access content protected by an outdated $K_B$. If a device attempts to access content, bound to a previous cluster, that was not rebound using a new $K_B$, access to the content is denied. If the current cluster is not using the same binding ID as the devices previous cluster, devices are unable to calculate the $K_B$ used to encrypt, or bind, the content. In other words, content may be legally licensed to the new cluster but unusable by any device in the cluster. This issue even affects the recovery of backup content that was saved to storage media prior to a cluster merge.

Turning now to the figures, FIG. 1 is a block diagram of one example of a data distribution architecture 100 that supports broadcast encryption (BE) for content protection and may implement the claimed subject matter. Those with skill in the computing arts should appreciate that such a system can be employed for a wide variety of data distribution systems and services including, but not limited to, the distribution of media content and control of and collection of data from devices such as smart meters and health monitors. A computing system 102 includes a central processing unit (CPU) 104, which is coupled to a monitor 106, a keyboard 108 and a mouse 110. Monitor 106, keyboard 108 and mouse 110 facilitate human interaction with computing system 102. Attached to CPU 104 is a data storage component 112, which may either be incorporated into CPU 104, i.e. an internal device, or attached externally to CPU 104 by means of various, commonly available connection devices such as but not limited to, a universal serial bus (USB) port (not shown). Data storage 112 is illustrated storing an example of content, i.e. digital content 114, which is used as an example of one implementation of the disclosed technology below in conjunction with FIGS. 3-5. It should be noted that although digital content 114 is described as digital data, there is no requirement that content protected by the claimed subject matter be digital in nature. The claimed subject matter is equally applicable to analog content. In other words, digital content 114 is used merely as an example for the purposes of illustration.

Also stored on data storage is a content control system (CCS) 116 that is one example of logic that may implement aspects of the claimed subject matter. CCS 116 is described in more detail below in conjunction with FIGS. 2-5. It should be noted that CCS 116 is shown installed on client system 102 for the purpose of the following description but could also be installed on any media or data delivery device, such as, but not limited, to, a digital video device/compact disk (DVD/CD) player 120, a set-top box (STB) 122, smart meter 123, a television 124 and a health monitor 125. CCS 116 may also be stored by network accessible (or attached) storage devices, i.e. stored in a remote Internet account but accessible by the network. CCS 116 may also be comprised of many different storage devices and locations but made to appear as one logical system via file system software (e.g. network file system or grid file system). Also stored on data storage 112 is a Binding ID Archive (BIDA) 118 that is employed to implement the claimed subject matter. BIDA 118 is described in more detail below in conjunction with FIGS. 2-5.

Computing system 102 is part of an authorized, or trusted, domain 129 of devices. In general, an authorized or trusted domain is a group of devices that adhere to the standards of the claimed subject matter and are able to freely share digital content that is authorized for use by any one of them and in which the authorization has not been revoked. Trusted domain 129, in this example, may also include DVD/CD player 120, set-top box (STB) 122, smart meter 123, television 124 and health monitor 125 and flash memory (not shown). Devices 102, 120 and 122-125 are used merely as examples of types of devices that might be included in an authorized or trusted domain such as domain 129. Those with skill in the arts should appreciate that are many types of devices, such as, but not limited to, a digital video recorders (DVR), personal computer (PC), book reader, portable drives, mobile phones, and so on, that would benefit form the ability to freely share digital content that is otherwise protected from devices outside of a trusted domain.

Devices 102, 120 and 122-125 of trusted domain 129 are communicatively coupled via a local area network (LAN) 128. Of course, there are many options for coupling such devices including direct connections, wireless connections and even over multiple interconnected LANs (not shown), a metro area network (MAN) or a wide area network (WAN). In addition, there could be devices (not shown) coupled to LAN 128 or any of devices 102, 120 and 124-125 that are not included in trusted domain 129. A disk 126 implementing, in this example, Content Protection for Recordable Media (CPRM) is rendered and maybe produced by DVD/CD player 120. CPRM is also applicable to streamed media content. In addition to CPRM, other examples of content protection schemes include Secure Digital (SD) cards (not shown) and Content Protection for Extended Media (CPXM). Disk 126 may include information for implementing the claimed subject matter. It should be noted that CPRM disk 126 is used merely as an example of one of multiple possible content protection schemes. One other example is the Advanced Access Content System (AACS) developed by a consortium including IBM and other companies.

LAN 128 is coupled to the Internet 130, which is communicatively coupled to a server 132. In the following description, server 132 is used as an example of a source of downloaded digital content. Although not shown, server 132 typically includes a CPU, or processor, keyboard, mouse and monitor to enable human interaction. Although in this example, computing system 102 and server 132 are communicatively coupled via LAN 128 and the Internet 130, they could also be coupled through any number of communication mediums such as, but not limited to, a direct wire or wireless connection. Further, server 132 could be linked directly to LAN 128 and could be either included in trusted domain 129 or not. In this example, server 132 is not part of trusted domain 129. Server 132 is coupled to a data storage device 134, which, like data storage 112, may either be incorporated into server 132 i.e. an internal device, or attached externally to server 132 by means of various, commonly available connection devices such as but not limited to, a universal serial bus (USB) port (not shown). Data storage 134 is illustrated storing a CCS 136, which is described in more detail below in conjunction with FIG. 2-5.

Also couple to Internet 130 is a licensing authority (LA) 138, which as explained in detail below, generates management key blocks (MKBs), one of which, an MKB 139, is illustrated. MKB 139 is associated with content such as digital content 114 and delivered to a client in conjunction with the associated encrypted content. For example, if digital content 114 was originally delivered on CPRM 126, MKB 139 would typically also be delivered via CPRM 126. LA 138, CCSs 116 and 136 and MKBs such as MLK 139 are employed to implement aspects of the claimed subject matter and are described in more detail below in conjunction with FIG. 2-5.

Figure 2:
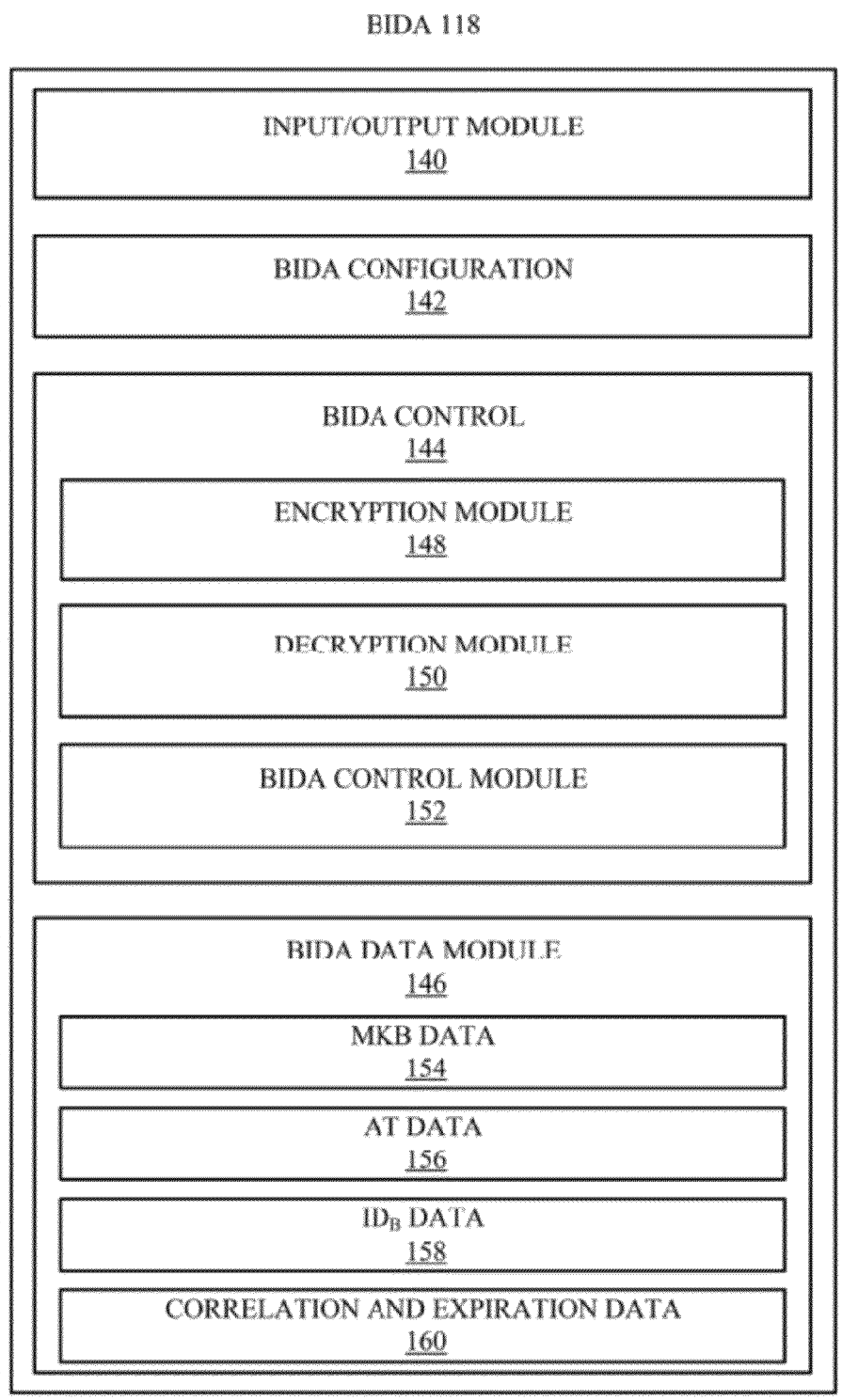
FIG. 2 is a block diagram of a Binding ID Archive (BIDA), first introduced in FIG. 1, in more detail.

FIG. 2 is a block diagram of a BIDA such as BIDA 118, first introduced in conjunction with FIG. 1, in more detail. In this example, BIDA 118 is stored on data storage 112 (FIG. 1) and logic associated with BIDA 118 is executed on CPU, or processor, 104 (FIG. 1) of computing system 102 (FIG. 1). Of course, BIDA 118 could also be stored and executed on another device of trusted domain 129 as long as the device is a currently authorized device of cluster 129. BIDA 118 includes an input/output (I/O) module 140, a BIDA Configuration module 142, a BIDA Control module 144 and a BIDA data module 146. It should be understood that the representation of BIDA 118 in FIG. 2 is a logical model. In other words, components 140, 142, 144, 146 and other components described below may be stored in the same or separate files and loaded and/or executed within services of cluster 129 either as a single system or as separate processes interacting via any available inter process communication (IPC) techniques.

I/O module 140 handles communication BIDA 118 has with other components of computing system 102 and device of trusted domain 129. BIDA configuration module 142 stores parameters defined by an administrator to control the setup and operation of BIDA 1186. Examples of such configuration parameters include, but are not limited to, security settings, display options and so on. In addition, parameters may be defined that list potential users, applications and computing hosts and corresponding levels of security and specific implementations of the claimed technology.

BIDA control module 144 includes logic to control the operation of BIDA 118 in conformity with parameters stored in BIDA configuration 142. BIDA control module 144 includes an encryption module 148, a decryption module 150 and a binding ID control module (BICM) 152, all of which are explained in more detail below in conjunction with FIGS. 3-5. One control parameter may indicate different options for the protection of BIDA 118 and the stored data. For example, one option may specify that stored MKB, AT and $ID_B$ data is encrypted and another option may specify that the entire BIDA 118 is encrypted.

BIDA data module 146 is a data repository for information, including settings and other information that BIDA 118 requires during operation. A MKB data 154 stores each MKB that is transmitted to the devices of trusted domain 129 (FIG. 1), including any merged clusters; an AT data 156 stored each authorization table transmitted to the devices of trusted domain 129 and any merged clusters; and an $ID_B$ data 158 stores each binding ID associated with trusted domain 129 and merged clusters. As explained in more detail below, each of MKB data 154, AT data 156 and $ID_B$ data 158 each record also includes an identifier and or hash value that enables a particular record to be associated with a previous record in the corresponding area 154, 156 or 158. In other words, a record corresponding to a particular version of a newly stored MKB includes not only the particular MKB but also means to identify the previous version, and perhaps size, of the record corresponding to the superseded version of MKB in BIDA 118.

A Correlation and Expiration Data 160 stores information on each record stored in MKB data 154, AT data 156 and $ID_B$ data 158 for use in the management of BIDA Data Module 146. Management functions may include removing a record from modules 154, 156 or 158 when the data is no longer necessary. Types of information in data 160 include, but is not limited to, data to enable BIDA 118 to correlate particular records of 154, 156 and 158 with specific protected content so that the particular records may be removed when the specific content no longer needs to be accessed, either because the content has been deleted or has reached an expiration date. In the alternative, information stored in module 160 may be stored in conjunction with individual records of modules 145, 156 and 158.

In one embodiment, any MKB, AT or $ID_B$ that changes is stored in a corresponding area 154, 156 or 158, along with information to identify the record corresponding to the previously stored MKB, At or $ID_B$, respectively. In another embodiment, any change in a MKB, AT or $ID_B$ triggers storage of all three current MKB, AT and $ID_B$ structures as a bundle, along with identification/hash data to enable the previous stored bundle to be located in and retrieved from BIDA 118. In addition, as explained below, the stored MKB, AT, $ID_B$ or bundle of the three is encrypted for storage in BIDA 118 using the current MKB, AT and $ID_B$.

Although not illustrated, BIDA data module 146 may also store other data necessary for the operation of BIDA 118, including intermediate results associated with the processing of BIDA 118. Processing associated with elements 118, 140, 142, 144, 146, 148, 150, 152, 154, 156 and 158 are described in more detail below in conjunction with FIGS. 3-5.

Figure 3:
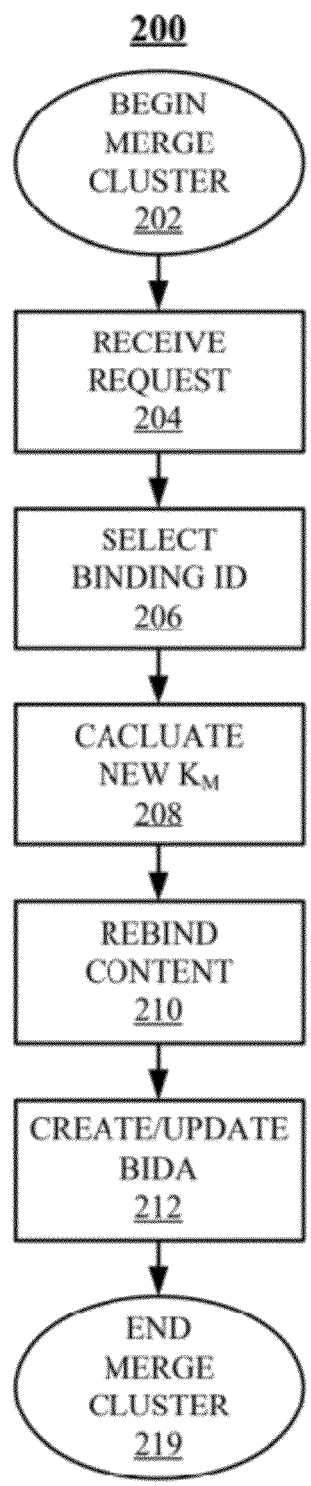
FIG. 3 is a flow chart illustrating one example of a Merge Cluster process according to the claimed subject matter.

FIG. 3 is a flow chart illustrating one example of a Merge Cluster process 200, according to the claimed subject matter, that may trigger an creation/update of BIDA 118 (FIG. 1). It should be understood that process 200 is only one example of an event that triggers a creation or update of BIDA 118. For example, BIDA 118 is updated whenever a MKB, AT or $ID_B$ is updated or replaced. Those with skill in the art of broadcast encryption should appreciate that MKBs, ATs and $ID_B$s are typically updated or superseded at different intervals and frequencies and for many different reasons, including a simple security refresh. In this example, logic associated with process 200 is stored in data storage 112 and executed on CPU 104 of computing system 102.

Process 200 starts in a "Begin Merge Cluster" block 202 and proceeds immediately to a "Receive Request" block 204. During block 204, process 200 receives a request to add a device to the current cluster. In this example, health monitor 125 (FIG. 1) is added to the cluster of devices represented by trusted domain 129. As explained above, each device is part of a cluster when manufactured, although typically the cluster only originally only includes the device itself, and each cluster posses their own secret binding IDs. During a "Select Binding ID" block 206, process 200 selects one of the $ID_B$s corresponding to the clusters that are being merged, e.g., trusted domain 129 and the cluster consisting only of device 125. During a "Calculate New $K_M$" block 208, process 200 calculates, using the $ID_B$ selected during block 206, a new binding, or management, key, $K_M$, to protect the newly merged cluster. During a "Rebind Content" block 210, process 200 employs the $K_M$ calculated during block 208 to rebind the content to be protected.

During a "Create/Update BIDA" block 212, process 200 stores the newly created MKB, AT and IDB, or any that have changed, in BIDA 118 in conjunction with a means to link the new records with the previous records. Block 212 is described in more detail below in conjunction with FIGS. 4 and 5.

Finally, process 200 proceeds to an "End Merge Cluster" block 219 in which process 200 is complete.

Figure 4:
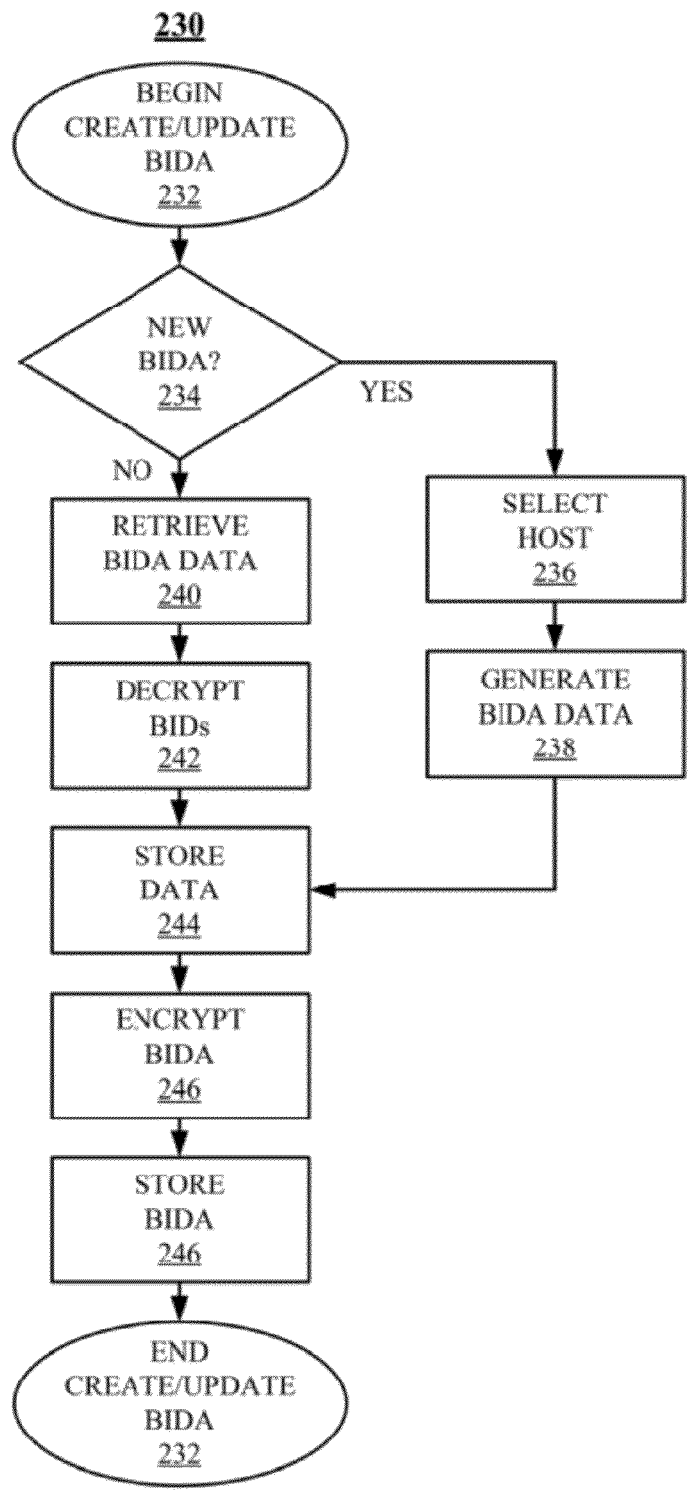
FIG. 4 is a flowchart illustrating one example of a Create/Update BIDA process according to the claimed subject matter.

FIG. 4 is a flowchart illustrating one example of a Create/Update BIDA process 230 according to the claimed subject matter. Like process 200 (FIG. 3), in this example, logic associated with process 230 is stored on data storage 112 (FIG. 1) and executed on CPU 104 (FIG. 1) of computing system 102 (FIG. 1). Process 230 is also associated with BIDA 118 (FIGS. 1 and 2). For the purposes of the following description, a new, or "superseding," MKB, AT and/or $ID_B$ has been received by computing system 102 for processing in accordance with both typical broadcast encryption-based data protection schemes and the disclosed archival scheme. The following description illustrates processing in accordance with the disclosed, archival scheme with respect to the existing MKB, AT and/or $ID_B$, which are referred to as the "current" MKB, AT and/or $ID_B$, respectively. In addition, the most current versions of MKB, AT and $ID_B$ stored in BIDA data blocks 154, 156 and 158 are called the "last" MKB, AT and $ID_B$, respectively.

Process 230 starts in a "Begin Create/Update BIDA" block 232 and proceeds immediately to a "New BIDA?" block 234. During block 234, process 230 determines whether or not BIDA data module 146 (FIG. 2) exists and has stored data corresponding to previous MKBs, ATs and $ID_B$s. If not, control proceeds to a "Select Host" block 234 during which a host, typically a device within trusted domain 129 (FIG. 1) is selected on which to create and/or store a BIDA data module such as BIDA data module 146 corresponding to BIDA 118. Although in this example BIDA data module 146 is stored in conjunction with BIDA 118, module 146 may be stored on any device in trusted domain 129 or even on another device that provides the claimed subject matter as a service to the devices of trusted domain 146. During "Generate BIDA data" block 238, process 230 allocates storage for MKB data 154, AT data 156 and $ID_B$ data 158.

If, during block 234, process 230 determines that BIDA data module has already been established, process 230 proceeds to a "Retrieve BIDA data" block 240 during which BIDA data block 146 is retrieved for processing. During a "Decrypt BIDs" block 242, process decrypts data block 146 retrieved during block 240 using the current $K_M$ based upon the current MKB, AT and $ID_B$. During a "Store Data" block 244, process added the current MKB, AT and/or $ID_B$ to the corresponding section 154, 156 and/or 158, respectively, which either were created during block 238 or already existed if control passed through blocks 240 and 242. In addition, a link from the current MKB, AT and/or $ID_B$ to the last MKB, AT and/or $ID_B$ is created so that a user may step back into earlier and earlier versions of the MKB, AT and/$ID_B$ as necessary.

During an "Encrypt BIDA" block 246, process 230 encrypts the newly created/updated BIDA data 154, 156 and 158 using a $K_M$ based upon the new MKB, AT and $ID_B$. In other words, the disclosed technology enables a user to restore, from a backup or other data storage, content that was protected with earlier versions of MKBs, ATs and $ID_B$s by iteratively recreating older versions, provided that the user has been given the appropriate authorizations as represented by the new MKB, AT and $ID_B$. The process of recovering content protected in the described fashion is described in more detail below in conjunction with FIG. 5. In the alternative or in addition, BIDA 118 may be encrypted using the $M_K$ based upon the new MKB, AT and $ID_B$. Finally, during a "Store BIDA" block 246, the created/updated BIDA data 146 is stored in BIDA 118 and process 230 proceeds to an "End Update BIDA" block 249 in which process 230 is complete.

Figure 5:
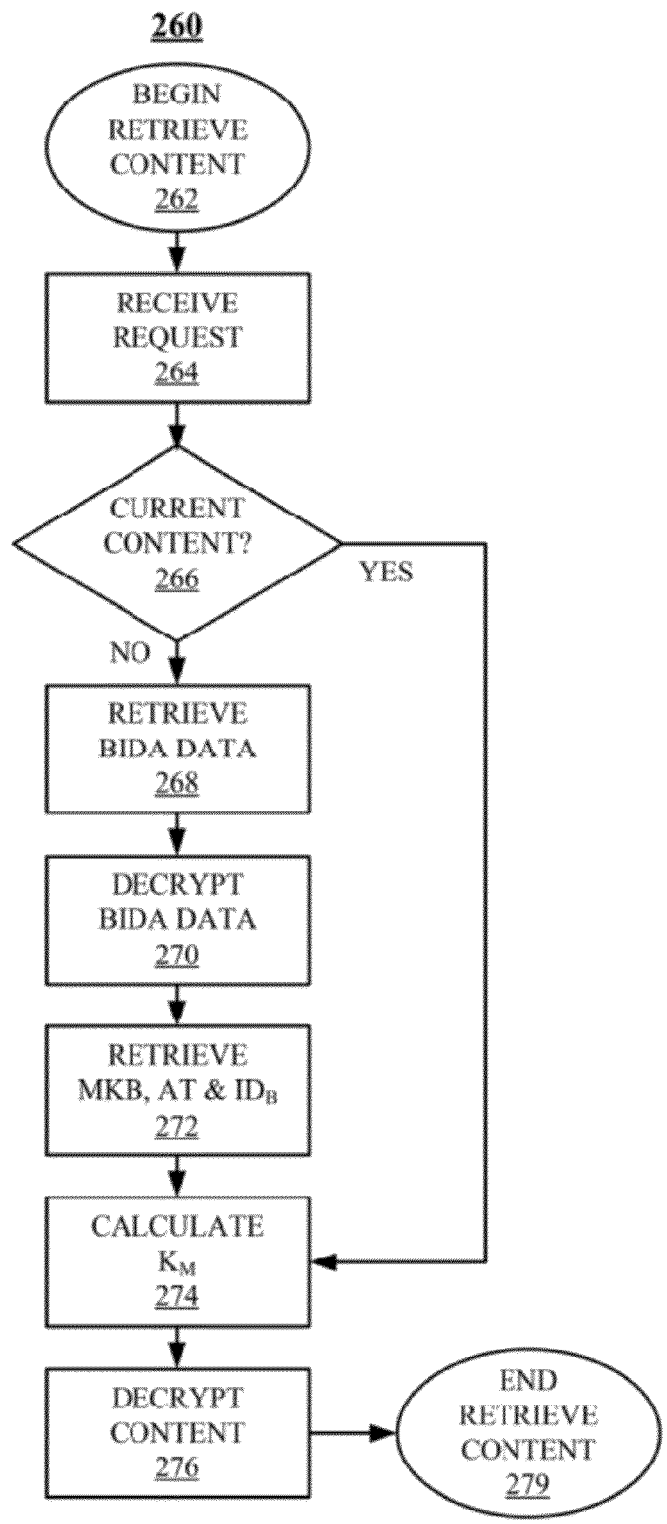
FIG. 5 is a flowchart illustrating one example of a Retrieve Content process according to the claimed subject matter.

FIG. 5 is a flowchart illustrating one example of a Retrieve Content process 260 according to the claimed subject matter. In this example, digital content 114 (FIG. 1) is used as an example of data retrieved by a user of computing system 102 (FIG. 1). In addition, in this example, logic associated with process 260 is stored on data storage 112 (FIG. 1) and executed on CPU 104 (FIG. 1) as part of CCS 116 (FIG. 1) or BIDA 118 (FIG. 1) working in cooperation.

Process 260 starts in a "Begin Retrieve Content" 262 and proceeds immediately to a "Receive Request" block 264. During block 264, process 230 receives a request to access protected data. During a "Current Content?" block 266, process 260 determines whether or not the content requested during block 264 has been protected with the current MKB, AT and $ID_B$. If not, i.e. the content was protected with an older version of MKB, AT and $ID_B$, control proceeds to "Retrieve BIDA Data" block 268 during which process 260 retrieves BIDA data 146 (FIG. 2) from BIDA 118. During a "Decrypt BIDA Data" block 270, process 260 decrypts MKB data 154 (FIG. 2), AT data 156 (FIG. 2) and $ID_B$ data 158 using the current MKB, AT and $ID_B$.

During a "Retrieve MKB, AT and $ID_B$" block 272 process 260, using the links that connect a particular version of the MKB, AT and $ID_B$ with the immediately preceding version (see 244, FIG. 4), process employs each version to decrypt the immediately preceding version until the specific version that encrypted digital content 114 is located and decrypted. Typically, the information that identifies the specific versions is stored in conjunction with digital content 114.

During a "Calculate $K_M$" block 274, a $K_M$ is generated that corresponds to the specific KMB, AT and $ID_B$ located and decrypted during block 272. Of course, if control passes to block 274 directly from block 266, i.e. digital content is protected with the current versions MKB, AT and $ID_B$, then the current MKB, AT and $ID_B$ are employed to generate a $K_M$.

During a "Decrypt Content" block 276, digital content is decrypted with the $K_M$ generated during block 274. In this manner, digital content that has been protected with outdated versions of MKB, AT and $ID_B$ can be accessed by those devices that are authorized under the current MKB, AT and $ID_B$. Finally, during an End Retrieve Content" block 279, process 260 is compete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising;
generating a first management key ($K_M$) based upon a first set of items corresponding to a broadcast encryption-based data protection scheme and corresponding to a first device associated with a duster of devices, wherein the first $K_M$ is unique to the first device of the cluster of devices, wherein the first set of items comprises:
a management key block (MKB);
an authorization table (AT); and
a first binding identifier ($ID_B$);
storing the first $K_M$ and the first set of items in a computer-readable storage medium at a first storage location associated with is first storage reference;
encrypting the first $ID_B$ of the first set of items using the first $K_M$ to generate a first archival $ID_B$;
generating a first archival record utilizing the first archival $ID_B$ and the first storage reference;
receiving a second set of items, wherein one or more of the second set of items supersedes one or more items of the first set of items and wherein a first modified set of items comprises the second set of items and any items of the first set of items that have not been superseded;
generating a second $K_M$ based upon the first modified set of items;
encrypting, using the second $K_M$, the first $ID_B$ to produce a second encrypted $ID_B$;
storing the modified set of items in the computer-readable storage medium at a second storage location associated with a second storage reference;
generating a second archival record utilizing the second encrypted $ID_B$ and the second storage reference; and
encrypting the MKB associated with the first set of items and the first $ID_B$ with the first $K_M$ prior to inclusion in the first archival record.

2. The method of claim 1, wherein the computer-readable storage medium is accessible by a second device in a cluster of devices associated with the first device.

3. The method of claim 1, further comprising encrypting the archive.

4. A method, comprising:
generating a first management key ($K_M$) based upon a first set of items corresponding to a broadcast encryption-based data protection scheme and corresponding to a first device associated with a cluster of devices, wherein the first $K_M$ is unique to the first device of the cluster of devices, wherein the first set of items comprises:
  a management key block (MKB);
  an authorization table (AT); and
  a binding identifier ($ID_B$);
  storing each item of the first set of items in a computer-readable storage medium at a corresponding location of a plurality of storage locations, each location associated with a corresponding storage reference of a first plurality of storage references;
  encrypting the first $ID_B$ of the first set of items using the first $K_M$ to generate a first archival $ID_B$;
  generating a first archival record utilizing the first archival $ID_B$ and the first plurality of storage references;
  receiving a second set of items, wherein one or more of the second set of items supersedes one or more items of the first set of items and wherein a first modified set of items comprises the second set of items and any items of the first set of items that have not been superseded;
  generating a second $K_M$ based upon the first modified set of items;
  encrypting, using the second $K_M$, the first $ID_B$ to produce a second encrypted $ID_B$;
  storing the second $K_M$ and the each of the modified set of items in the computer-readable storage medium at a corresponding storage location of a second plurality of storage locations, each location of the second plurality of storage locations associated with a corresponding storage reference of a second plurality of storage references;
  generating a second archival record utilizing the second encrypted $ID_B$ and the second plurality of storage references; and
  encrypting the MKB associated with the first set of items and the first $ID_B$ with the first $K_M$ prior to inclusion in the first archival record.

5. The method of claim 4, wherein the computer-readable storage medium is accessible by a second device in a cluster of devices associated with the first device.

6. The method of claim 4, further comprising encrypting the archive.

7. The method of claim 1, further comprising:
  detecting a second $ID_B$ in the second set of items; and
  encrypting, using the second $K_M$, the second $ID_B$, rather than the first $ID_B$ to produce a second encrypted $ID_B$.

8. The method of claim 4, further comprising:
  detecting a second $ID_B$ in the second set of items; and
  encrypting, using the second $K_M$, the second $ID_B$, rather than the first $ID_B$ to produce a second encrypted $ID_B$.

9. An apparatus, comprising:
  a processor;
  a first computer-readable storage medium coupled to the processor; and
  logic, stored on the first computer-readable storage medium and executed on the processor, for:
    generating a first management key ($K_M$) based upon a first set of items corresponding to a broadcast encryption-based data protection scheme; wherein the first set of items comprises:
      a management key block (MKB);
      an authorization table (AT); and
      a first binding identifier ($ID_B$);
    storing the first $K_M$ and the first set of items in a computer-readable storage medium at a first storage location associated with a first storage reference;
    encrypting the first $ID_B$ of the first set of items using the first $K_M$ to generate a first archival $ID_B$;
    generating a first archival record utilizing the first archival $ID_B$ and the first storage reference;
    receiving a second set of items, wherein one or more of the second set of items supersedes one or more items of the first set of items and wherein a first modified set of items comprises the second set of items and any items of the first set of items that have not been superseded;
    generating a second $K_M$ based upon the first modified set of items;
    encrypting, using the second $K_M$, the first $ID_B$ to produce a second encrypted $ID_B$;
    storing the modified set of items in the computer-readable storage medium at a second storage location associated with a second storage reference;
    generating a second archival record utilizing the second encrypted $ID_B$ and the second storage reference; and
    encrypting the MKB associated with the first set of items and the first $ID_B$ with the first $K_M$ prior to inclusion in the first archival record.

10. The apparatus of claim 9, the logic further comprising logic for:
  detecting a second $ID_B$ in the second set of items; and
  encrypting, using the second $K_M$, the second $ID_B$, rather than the first $ID_B$ to produce a second encrypted $ID_B$.

11. The apparatus of claim 9, wherein the computer-readable storage medium is accessible by a second device in a cluster of devices associated with the first device.

12. The method of apparatus 9, the logic further comprising logic for encrypting the archive.

13. A computer programming product, comprising:
  a first, non-transitory computer-readable storage medium; and
  logic, stored on the first computer-readable storage medium for execution on a processor, for:
    generating a first management key ($K_M$) based upon a first set of items corresponding to a broadcast encryption-based data protection scheme; wherein the first set of items comprises:
      a management key block (MKB);
      an authorization table (AT); and
      a first binding identifier ($ID_B$);
    storing the first $K_M$ and the first set of items in a computer-readable storage medium at a first storage location associated with a first storage reference;
    encrypting the first $ID_B$ of the first set of items using the first $K_M$ to generate a first archival $ID_B$;
    generating a first archival record utilizing the first archival $ID_B$ and the first storage reference;
    receiving a second set of items, wherein one or more of the second set of items supersedes one or more items of the first set of items and wherein a first modified set of items comprises the second set of items and any items of the first set of items that have not been superseded;
    generating a second $K_M$ based upon the first modified set of items;
    encrypting, using the second $K_M$, the first $ID_B$ to produce a second encrypted $ID_B$;
    storing the modified set of items in the computer-readable storage medium at a second storage location associated with a second storage reference;
    generating a second archival record utilizing the second encrypted $ID_B$ and the second storage reference; and encrypting the MKB associated with the first set of items and the first $ID_B$ with the first $K_M$ prior to inclusion in the first archival record.

14. The computer programming product of claim 13, the logic further comprising logic for:
  detecting a second $ID_B$ in the second set of items; and
  encrypting, using the second $K_M$, the second $ID_B$, rather than the first $ID_B$ to produce a second encrypted $ID_B$.

15. The computer programming product of claim 13, wherein the computer-readable storage medium is accessible by a second device in a cluster of devices associated with the first device.

16. The computer programming product of claim 13, the logic further comprising logic for encrypting the archive.

* * * * *